United States Patent [19]

Armer

[11] 3,713,130

[45] Jan. 23, 1973

[54] IMPACT DETECTOR

[75] Inventor: Herbert Leslie Armer, Slough, Buckinghamshire, England

[73] Assignee: Mastertape (Magnetic) Limited, Colnbrook Slough, Buckinghamshire, England

[22] Filed: March 15, 1971

[21] Appl. No.: 124,357

[30] Foreign Application Priority Data

March 23, 1970 Great Britain....................13,996/70

[52] U.S. Cl...340/267 R, 179/100.2 P, 340/174.1 E, 340/261, 346/17

[51] Int. Cl.............................................G08b 21/00

[58] Field of Search..340/261, 267 R, 269, 271, 421, 340/174.1 E; 346/17; 179/100.2 P

[56] References Cited

UNITED STATES PATENTS

| | | | |
|---|---|---|---|
| 2,866,301 | 12/1958 | Koulicovitch et al | 340/261 X |
| 3,109,165 | 10/1963 | Bagno | 340/261 X |
| 2,927,282 | 3/1960 | Gardberg | 340/261 UX |
| 3,513,463 | 5/1970 | Stevenson et al | 340/261 X |
| 3,290,666 | 12/1966 | Crew | 179/100.2 P |
| 3,513,465 | 5/1970 | Titherington | 340/261 |
| 3,401,383 | 9/1968 | Ault | 179/100.2 P X |

*Primary Examiner*—David L. Trafton
*Attorney*—Holcombe, Wetherill & Brisebois

[57] ABSTRACT

An impact detector for detecting input between a record or replay head and a magnetic disc rotating relative to the head comprises a piezo-electric element mounted on one of the bodies, e.g., the head, and producing an output signal when that body contacts or is contacted by the other body, e.g., the magnetic disc. The output is amplified and applied to indicating and/or warning means operated by the amplified output.

5 Claims, 4 Drawing Figures

IMPACT DETECTOR

The present invention relates to an impact detector for detecting when two relatively moving bodies touch one another.

The invention consists in an impact detector device for detecting when two relatively moving bodies touch one another comprising a piezoelectric element mounted on one of the bodies and producing an electrical output signal when said body contacts or is contacted by the other body, amplifying means for amplifying said output signal, and indicating and/or warning means operated by said amplified output signal.

Preferably the amplified output signal is fed to a pulse forming circuit which produces an output pulse fed to said indicating or warning means.

The amplifying means may comprise a first stage including a feedback loop which consists of a parallel tuned circuit resonant at the selected output frequency from the piezoelectric element and a second stage driven from the first stage and whose output is applied through a high impedance path to the input of the first stage. Alternatively, the amplifying means may comprise an operational amplifier feeding a bridge-T network employed as a feedback circuit to give the effect of a narrow band-pass circuit, said bridge-T network producing no feedback at a point on its characteristic which corresponds to the resonant frequency of the piezoelectric element and accordingly producing a sharp rise in gain of the amplifier at this point.

The output from the second stage may be applied through a demodulator to the input of a Schmitt trigger circuit producing an output pulse indicative of the duration of the contact or impact between the two bodies. The Schmitt trigger circuit may feed a monostable circuit producing a pulse for operating a warning system on the occurrence of contact or impact between the two bodies.

The invention also provides the combination of a plurality of magnetic discs mounted in a stack or pack and having a record or replay head associated with at least one side of each disc and an impact detector device as hereinbefore described associated with said heads and including a piezoelectric element mounted on each head.

Figure 1:
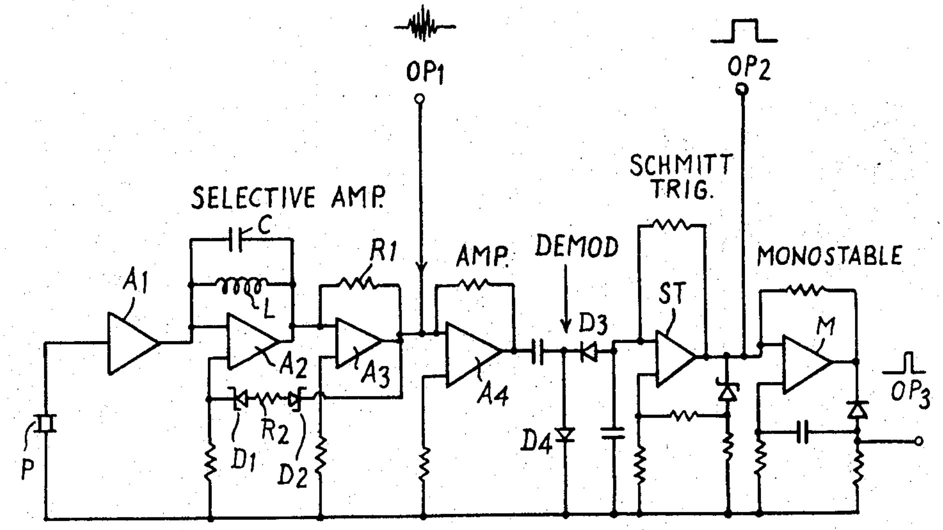
Figure 2:
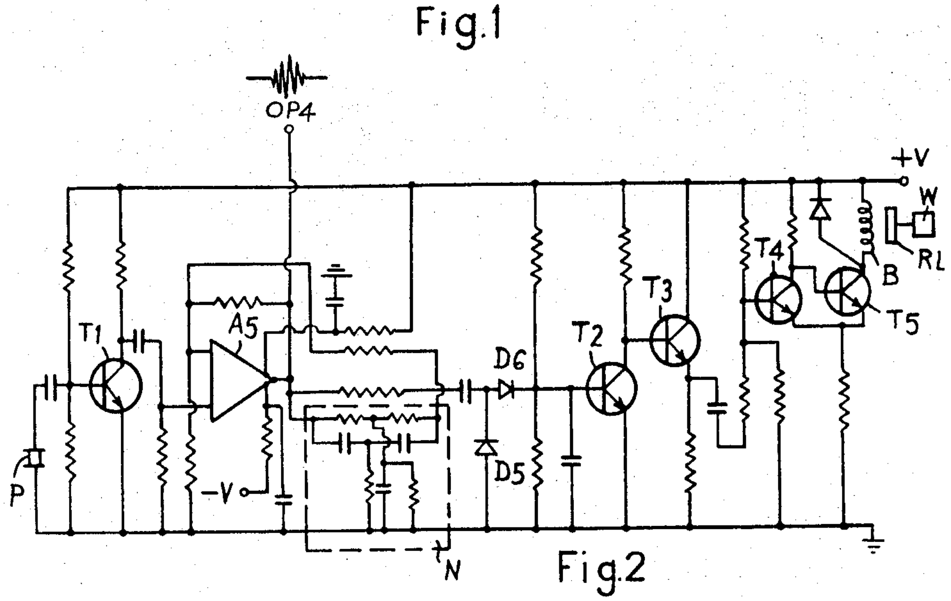
Figure 3:
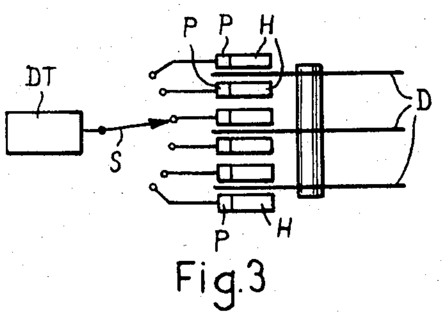
Figure 4:
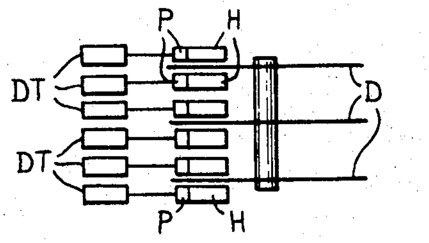

The invention will now be further described, by way of example, with reference to the accompanying drawings, in which:

FIG. 1 is a simplified circuit diagram of one embodiment of impact detector according to the invention, FIG. 2 is a circuit diagram of a further embodiment, and FIGS. 3 and 4 show diagrammatically two arrangements for detecting contact between record or replay heads and associated magnetic discs arranged in a stack or pack.

The embodiments to be described are particularly intended for detecting impact between a record or replay head and a magnetic disc which rotates relative to the head and wherein the head is normally maintained slightly spaced from the surface of the disc by a film of air. In such apparatus the disc rotates at a fairly high speed, e.g., about 2,000 r.p.m. and any physical contact between the head and the magnetic coating of the disc, due to particles of dirt or dust or imperfections in the disc coating, can rapidly damage the coating and/or the head and also cause the loss of information being recorded or read. It is therefore highly desirable to be able to detect such contact or impact in order that the cause can be removed and the risk of such damage or loss of information be reduced or avoided.

Referring now to FIG. 1, a small piezoelectric element P is mounted on a record or replay head associated with a rotatable magnetic disc. The element P may be in the form of a small ceramic pellet and is polarized in the compression mode in order to discriminate against lateral movements. A suitable element is made by Plessey Ltd of a ceramic material PC5 and has a diameter of about 6 mm, and a thickness of about 2 mm. The piezoelectric element can produce an output frequency of about 40 KHZ which appears to be the resonant frequency of the element. This output frequency, which is produced if physical contact occurs between the head and the disc, is applied through an amplifier A1, which may employ a field effect transistor, to give a high input impedance and low noise amplification. The output of A1 is applied to a selective amplifier comprising two operational amplifiers A2 and A3. The amplifier A2 has a feedback loop comprising a high-Q parallel tuned circuit LC resonant at the output frequency of the piezoelectric element 1. The amplifier A3 has a feedback loop comprising resistor R1, and also overall feedback is applied from its output to the input of amplifier A2 via two zener diodes D1, D2 connected back-to-back and a series resistor R2.

The output of amplifier A3 is fed through a further amplifier A4 to a demodulator comprising diodes D3, D4, which feeds a Schmitt trigger circuit ST whose output is applied to a monostable circuit M.

In operation, at frequencies other than resonance the input impedance at both inverting and non-inverting inputs of amplifier A2 is high as in this condition the feedback is large and gives high attenuation to off-tune frequencies. As resonance is approached, the input impedance falls at both inputs but the impedance of the LC feedback circuit increases so that the gain increases due to the falling feedback at the inverting input. At the same time the overall feedback via diodes D1 and D2 to the non-inverting input is falling due to the decreasing input impedance. The output is the difference of the two inputs and is arranged to be low. In this way the narrow band width of the high-Q LC circuit is retained without the disadvantage of the slow response associated with High-Q circuits. The Schmitt trigger circuit ST produces a pulse of a length proportional to the duration of the contact or impact and the monostable circuit M is triggered by the trailing edge of this pulse to produce a logic output pulse for a warning device which may be a lamp or an audible warning device.

An output OP1 may be derived from amplifier A3 and an output OP2 from the Schmitt trigger circuit ST. The output OP1 can be applied to an oscilloscope and its envelope shape and amplitude give an indication of the nature of the contact or impact. The output OP2 applied to an oscilloscope enables the duration of the contact or impact to be measured.

Referring now to FIG. 2, there is shown the circuit diagram of a further embodiment of impact detector according to the invention. A piezoelectric element P, which may be similar to that employed in the embodiment of FIG. 1, produces an output upon physical contact occurring between a record or replay head and a magnetic disc and this output is applied to the amplifier transistor T1. The output from transistor T1 is applied to the operational amplifier A5 which in turn feeds a bridge-T network N which is employed as a feedback circuit to give the effect of a narrow band-pass circuit. The bridge-T network produces zero phase shift at the central point on its characteristic which corresponds to the resonant frequency of the piezoelectric element P and thereby gives a sharp rise in gain of the operational amplifier at this point. An output may be derived from terminal OP4 and applied to an oscilloscope to produce a picture of the pulse shape obtained upon impact occurring, the envelope shape and amplitude of the pulse giving an indication of the nature of the contact or impact. The output from the operational amplifier A5 is fed through a demodulator including the diodes D5 and D6 to a Schmitt trigger circuit comprising transistors T2 and T3. The output from the Schmitt trigger circuit is applied to a DC coupled monostable circuit comprising transistors T4 and T5 which produces a pulse of sufficient length to operate the coil B of a magnetically operated reed relay device RL. This latter device operates a warning device W, such as a lamp or an audible warning device.

In practice, as employed for information storage, a plurality of magnetic discs are mounted in a stack or pack or a record or replay head is associated with each side of each disc. This is shown diagrammatically in FIGS. 3 and 4, where a stack of discs D have a record or replay head H associated with each side of each disc and a piezoelectric element P is mounted on each head. For the sake of clarity only a few discs have been shown in the stack and the spacing between the discs has been exaggerated. In the arrangement of FIG. 3, a single impact detector device DT constructed according to FIG. 1 or FIG. 2, is provided and the selector switch S is connected to selectively switch the piezoelectric elements P to the detector device DT. Alternatively, as shown in the arrangements of FIG. 4, a separate detector device DT may be connected to each of the piezoelectric elements P.

The detector of the invention may also be employed for detecting and examining surface imperfections in magnetic discs during manufacture and test. Moreover, it may also be employed in connection with objects other than magnetic discs to detect periods of undesirable contact between two relatively movable bodies which are arranged very close to each other but which are normally out of contact. It will be understood that both bodies may be moving, or one fixed and one moving.

I claim:

1. An impact detector device for detecting impact between a record or replay head and a magnetic disc rotating relative to the head comprising a piezo-electric element having a resonant frequency mounted on or adjacent said head and producing an electrical output signal at its resonant frequency when said head contacts or is contacted by said disc, amplifying means having a high gain at said resonant frequency for amplifying said resonant frequency output signal and warning means operated by said amplified output signal.

2. A device as claimed in claim 1, wherein the amplifying means comprises a first stage including a feedback loop which consists of a parallel tuned circuit resonant at the resonant frequency output from the piezoelectric element and a second stage driven from the first stage and whose output is applied through a high impedance path to the input of the first stage.

3. A device as claimed in claim 1, wherein the amplifying means comprises an operational amplifier feeding a bridge-T network employed as a feedback circuit to give the effect of a narrow band-pass circuit, and wherein the bridge-T network produces no feedback at a point on its characteristic which corresponds to the resonant frequency of the piezoelectric element and accordingly produces a sharp rise in gain of the amplifier at this point.

4. A device as claimed in claim 1, wherein the output from the amplifying means is applied through a demodulator to the input of a Schmitt trigger circuit producing an output pulse indicative of the duration of the contact or impact between said head and said disc and wherein the pulse from said Schmitt trigger circuit operates said warning means on the occurrence said contact or impact.

5. The combination of a plurality of magnetic discs mounted in a stack or pack and having a record or replay head associated with at least one side of each disc and an impact detector device associated with each of said heads and including a piezoelectric element having a resonant frequency mounted on each head for producing an electrical output signal at its resonant frequency when an impact occurs between that head and a disc, amplifying means having a high gain at said resonant frequency for amplifying the resonant frequency output signal from each piezoelectric device and warning means operated by said amplified output signal.

* * * * *